United States Patent [19]

Schirmer

[11] 4,095,012
[45] June 13, 1978

[54] ORIENTED NYLON AND LAMINATES THEREOF

[75] Inventor: Henry G. Schirmer, Spartanburg, S.C.

[73] Assignee: W. R. Grace & Co., Duncan, S.C.

[21] Appl. No.: 710,511

[22] Filed: Aug. 2, 1976

Related U.S. Application Data

[63] Continuation-in-part of Ser. No. 535,772, Dec. 22, 1974, abandoned.

[51] Int. Cl.² .................. B28B 3/20; B29C 1/00; C08L 77/00; B32B 27/34
[52] U.S. Cl. .................. 428/474; 260/857 TW; 264/176 R; 264/237; 264/291; 428/516; 428/523; 428/910
[58] Field of Search .................. 264/176 R, 237, 291; 428/474, 910, 516, 523; 260/857 TW

[56] References Cited

U.S. PATENT DOCUMENTS

| | | | |
|---|---|---|---|
| 2,715,591 | 8/1955 | Graham et al. | 428/474 X |
| 3,300,370 | 1/1967 | Mandel et al. | 428/474 X |
| 3,370,972 | 2/1968 | Nagel et al. | 428/474 X |
| 3,423,231 | 1/1969 | Lutzmann | 428/474 |
| 3,697,368 | 10/1972 | Bhuta et al. | 428/474 |
| 3,794,547 | 2/1974 | Kuga et al. | 428/910 X |
| 3,798,115 | 3/1974 | Hofmann et al. | 428/474 X |
| 3,908,070 | 9/1975 | Marzolf | 428/516 X |
| 3,955,040 | 5/1976 | Schirmer | 428/516 X |
| 3,997,383 | 12/1976 | Bieler et al. | 428/516 X |
| 4,011,358 | 3/1977 | Roelofs | 428/910 X |
| 4,016,321 | 4/1977 | McIntyre | 428/474 X |
| 4,041,206 | 8/1977 | Tsunashima et al. | 428/910 X |
| 4,056,419 | 11/1977 | Paine | 428/474 X |
| 4,058,647 | 11/1977 | Inoue et al. | 428/474 |

Primary Examiner—Harold Ansher
Attorney, Agent, or Firm—John J. Toney; William D. Lee, Jr.; John B. Hardaway

[57] ABSTRACT

A process for producing oriented films and laminates of nylon 66 and of blends of nylon 66 with nylon 6. In the process, moisture is excluded from the nylon preferably by coextruding a nylon layer between layers of polymeric material to form a laminate; and, after quenching the laminate, orientation may be performed after a relatively long time lapse.

5 Claims, 10 Drawing Figures

ORIENTED NYLON AND LAMINATES THEREOF

CROSS-REFERENCE TO RELATED APPLICATION

This application is a continuation-in-part of my application Ser. No. 535,772 which was filed on Dec. 22, 1974 having the same title as this present application now abandoned.

FIELD OF THE INVENTION

This invention relates to a process for producing oriented nylon 66 film and oriented film from blends of nylon 6 with nylon 66 and laminates thereof. Specifically, the invention relates to a process for preparing a laminate having a central layer of moisture-free, biaxially oriented nylon 66 or blends thereof with adjacent polymeric layers oriented to the same degree as the nylon layer.

BACKGROUND OF THE INVENTION

Prior art nylon laminates may be prepared by a variety of methods including extrusion coating and coextrusion and the laminates may be either oriented or unoriented. When preparing an oriented nylon laminate, the usual prior art practice is to stretch the laminate at relatively high temperatures, in excess of 150° F, and to perform orientation immediately after extrusion because nylon, after extrusion, will regain moisture which can impair its ability to orient. The effect of moisture on nylon is recognized in the prior art, e.g. in an article entitled "How To Extrusion Coat With Nylon" at page 125 of *Modern Plastics* magazine, July 1965, it is noted that a blanket of dry inert gas must be used to cover nylon granules in a hopper to prevent the nylon from absorbing moisture. Also, in U.S. Pat. No. 3,585,059 issued on June 15, 1971 to Daniel G. James, a waterproof coating is placed on a primed nylon substrate to protect the nylon from the water in a subsequently applied barrier coating dispersion thereby preventing wrinkling of the nylon substrate. In addition, U.S. Pat. No. 3,788,503 issued Jan. 29, 1974 to Hidenori Hirose et al keeps the water content of a poly-E-caproamide (nylon 6) film at not more than 2% while performing biaxial orientation. Accordingly, one object of the present invention is to produce a nylon laminate in which moisture is completely excluded from the nylon layer.

As mentioned above, the orientation of nylon laminates in prior art processes is usually performed at temperatures in excess of 150° F and the orientation takes place immediately, i.e. within a few seconds or less. In departing from the teachings of the prior art, it has been discovered that a nylon laminate prepared by excluding moisture from the nylon layer may be oriented at temperatures below 150° F and may be oriented either above or below 150° F after a relatively long time lapse of up to 2½ hours or somewhat longer. Thus, it is an object of the present invention to provide a nylon laminate which may be oriented at temperatures substantially below those taught in the prior art and in which the time lapse after quenching and before orientation is not critical.

In the prior art, when orientating a polyolefin/nylon laminate the olefin layers normally orient in the 13:1 to 25:1 biaxial stretching ratio or greater whereas nylon generally orients at biaxial ratio of about 6:1. However, in the process of the present invention, it has been surprisingly discovered that by orienting a nylon laminate wherein moisture has been excluded from the nylon layer that the olefin layers of the laminate will orient at the same ratio as the nylon layer. Accordingly, it is another object of the present invention to provide a nylon/olefin laminate in which all components of the laminate are oriented alike.

Still another object of the present invention is to provide a novel, improved, oriented film product comprising nylon 66 or a blend thereof with nylon 6.

The foregoing and other objects and advantages of the present invention will be readily appreciated by those skilled in the art from the following Summary of Invention.

SUMMARY OF INVENTION

In one aspect, the subject invention is a method for orienting a nylon film product, which is nylon 66 or a blend thereof with nylon 6, either as an unsupported film or as a supported layer in a laminate by excluding moisture from the nylon after it is extruded and before it is oriented. This is accomplished by extruding said nylon in a moisture free atmosphere, quenching said extrudate while preventing moisture from reaching the nylon, and, at any time up to 2 hours after extrusion stretch orienting said nylon. The process may include temporarily storing the quenched nylon film product before stretch orienting same.

In anther aspect, the subject invention is a process for producing a laminated film having a moisture free layer comprising an amide polymer. Preferably, the process includes the step of stretch orienting the laminate with the result that all layers of the laminate are oriented the same. The amide layer can be coextruded with at least one polymeric layer to protect it from moisture.

In another aspect, the present invention is a process for producing an oriented, laminated film having a biaxially oriented layer comprising an amide polymer comprising the steps of excluding moisture from the amide layer by coextruding the amide layer between adjacent layers of moisture resistant polymeric material to form a laminate, cooling or quenching said laminate, and then stretch orienting the laminate as long as 2½ hours or more after coextrusion. The process may include the step of heating the laminate into the temperature range of 120° to 140° F in order to stretch orient the laminate.

In still another aspect, the present invention includes a laminated film article which comprises a moisture free layer comprising an amide polymer with polymeric layers laminated to each side of the amide layer. Preferably, said polymeric layers and said amide layer are oriented to the same degree.

The invention may be better understood by reference to the drawings which are described below.

DRAWINGS

The present invention is described herein below with reference to the attached drawings which are made a part of this specification and in which.

Figure 9:
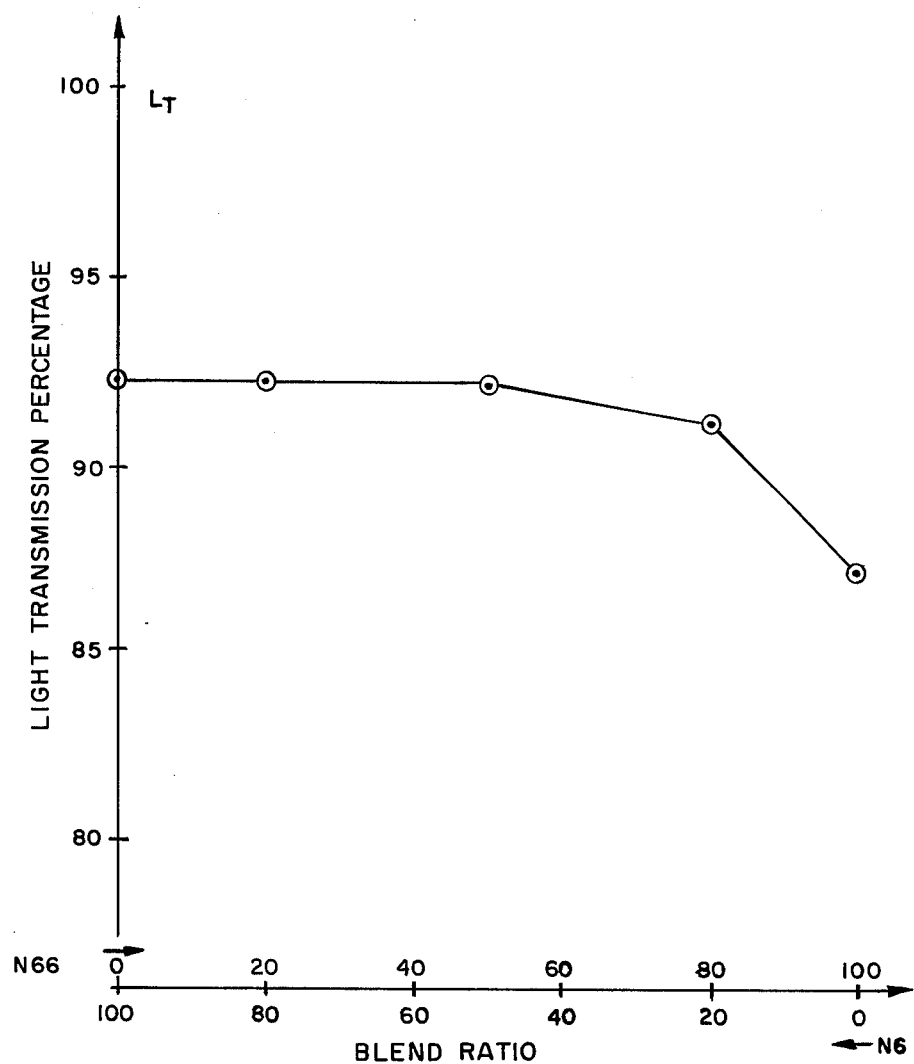
Figure 10:
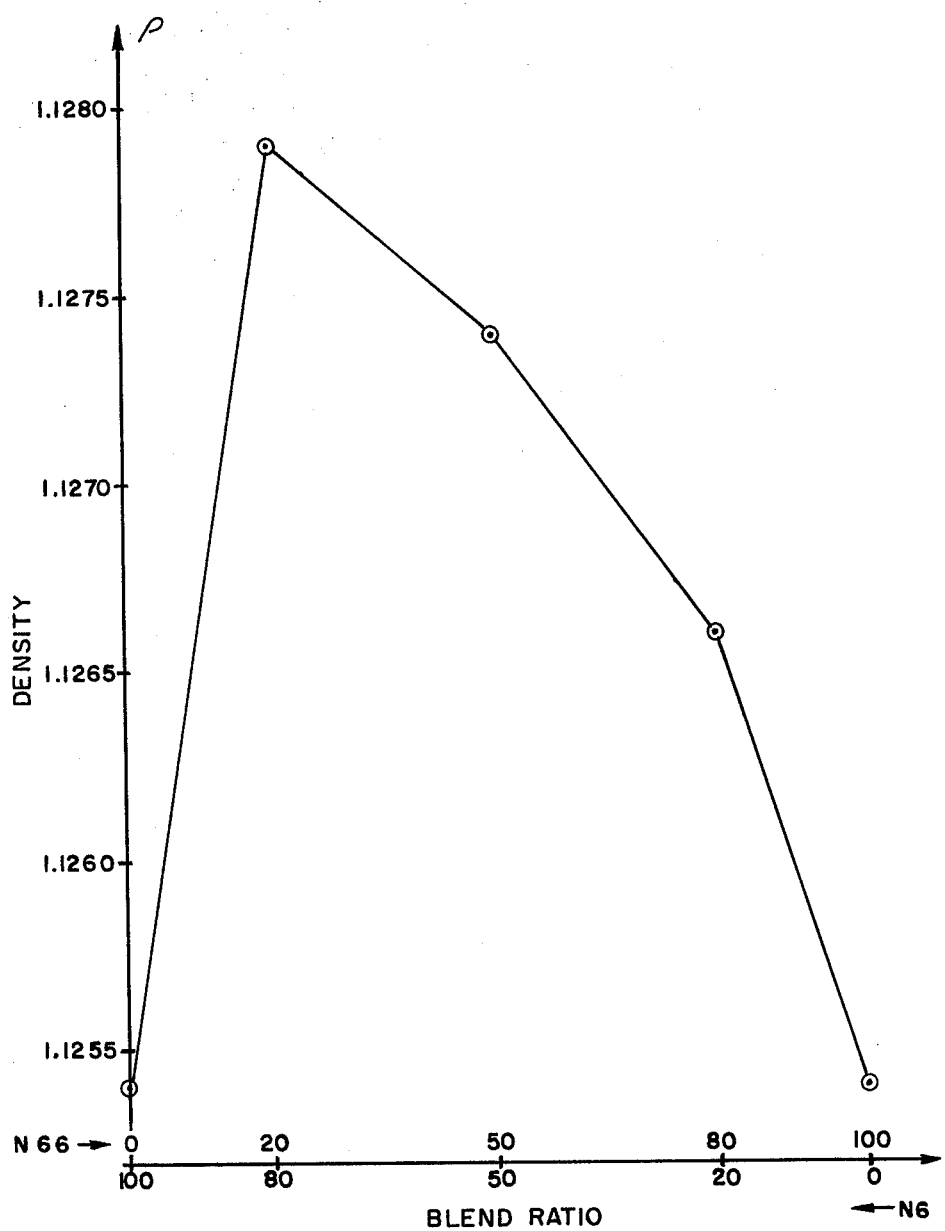

FIG. 9 is a curve of light transmission versus blend ratio of nylon 6 and nylon 66; and, FIG. 10 is a curve of film density versus ratio of nylon 6 and nylon 66.

DEFINITIONS

As used herein the word "polymer" include polymers, homopolymers, copolymers, interpolymers, block polymers, and graft polymers of the particular monomer to which references is being made.

"Nylon" or "amide polymer" means any of the polyamides or their co-, homo-, block, or graft, polymers which are suitable for forming both supported and unsupported films.

"Nylon 6" means a polymer of caprolactam having a melting point of about 410° F.

"Nylon 66" means a polymer which is a condensation product of adipic acid and hexamethylenediamine having a melting point of about 510° F.

"Oriented" or "orientation" means the ability of an unrestrained, stretched film to return to its dimensions prior to stretching. Thus, for example, a film stretched only monoaxially five times its original length has an orientation ratio of 5:1; and a film stretched twice its width and five times its length has an orientation ratio of 10:1. (In the strictest sense, however, orientation is the aligment of the crystalline structure of a polymeric material so as to produce a highly uniform structure.)

"Nylon film product" means an unsupported film consisting only of nylon, a blend of two nylons such as nylon 6 or nylon 66, or a laminate having a layer of nylon.

PREFERRED EMBODIMENT

Figure 1:
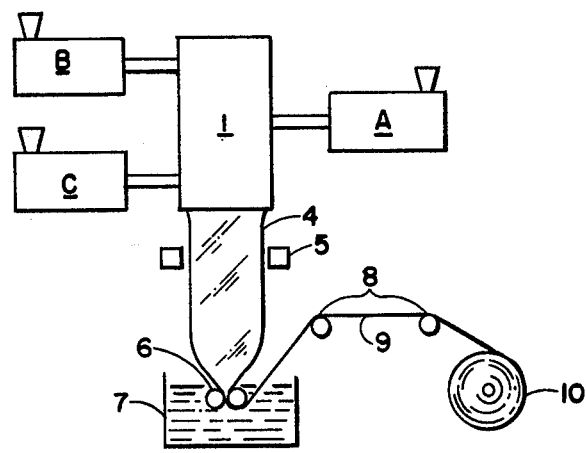
FIG. 1 is a schematic representation of the process of making the laminate of the present invention by the coextrusion method.

The preferred method of producing a laminate according to the present invention will be described now with reference to FIGS. 1 and 2. In FIG. 1 extruders A, B, and C are shown feeding coextrusion die 1. Nylon or a blend nylon polymers is being extruded from extruder A and polyolefins are being extruded from extruders B and C. This die is annular and the inner ply comes from extruder B with the central ply coming from extruder A and the outer ply coming from extruder C. A tubular laminate 4 emerges from the coextrusion die and is cooled by cooling ring 5 and thereafter collapsed between pinch rolls 6 in cooling bath 7. Cooling bath 7 is preferably about 40° F or less in order to quench or shock cool the molten material into a solid state.

After leaving the cooling path 7 the flattened tubing 9 is fed across guide rolls 8 and wound upon roll 10. During this process no moisture has contacted the inner polyamide layer. In prior art practices, nylon laminates would generally be stretch oriented immediately after extrusion and quenching. However, a laminate prepared according to the present invention wherein moisture has been completely excluded from the invention may be oriented up to 2½ hours after extrusion. Thus, a roll of flattened tubing 10 could be stored temporarily if production scheduling so required whereas a wet nylon single layer tubing could not.

Figure 2:
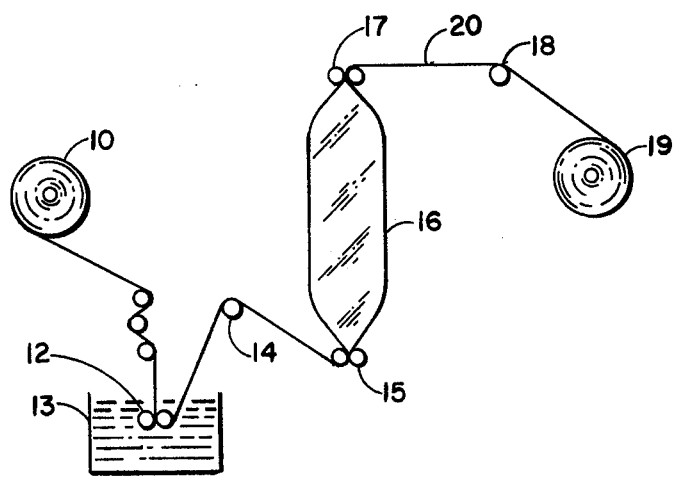
FIG. 2 is a schematic representation of one method of stretching orienting the laminate of the present invention.

In FIG. 2 a roll of flattened tubing 10 is unwound and fed through pinch rolls 12 into heated bath 13 which is preferably heated to the temperature range of 120° to 140° F. After being heated the flattened tubing is fed over guide roll 14 through pinch rolls 15 where it is expanded into bubble 16 under air pressure by the trapped bubble technique which is well known in the art. The bubble 16 is maintained by pinch rolls 15 and 17. After leaving the pinch roll 17, the laminate 20 has now been stretched to film thickness and passes over roll 18 to wind up roll 19 where it is stored and can be subsequently slit into film sheets or made into bags. It has been found that even at a biaxial orientation ratio of 6:1 the olefin layers will orient in the 120° to 140° F temperature range whereas olefins generally orient at 180° to 220° F at biaxial orientation ratios of 13:1 or greater.

The laminate of the present invention can also be prepared by coextrusion through a slot die with the polyamide layer sandwiched between two outer polymeric layers to exclude moisture from the amide layer. Stretch orientation is performed monoaxially by "racking" in which downstream pinch rollers are driven faster than upstream rollers and biaxial orientation is performed on a conventional tenterframe, orientation taking place, of course, after quenching and reheating to the 120° to 140° F temperature range.

In addition to extruding a nylon or polyamide layer between polymeric layers in order to prevent moisture from reaching the nylon layer, the purposes of the invention can be achieved by extruding any nylon film product in a completely dehumidified atmosphere and then quenching or shock chilling the nylon with cold dehumidified air. If stored in a dehumidified atmosphere, the time between extrusion and orientation will not be critical and may be delayed up to 2 to 2½ hours.

The invention is more specifically described in the following examples:

EXAMPLE I

The extrusion die configuration shown in FIG. 1 was modified to add three melt streams in addition to the three already present. The six ply tubing had as its two inner most layers, nylon 6 (Resin No. 8207, Allied Chemical Company) and immediately adjacent each outer side of the nylon 6 layers was a layer of ionomer copolymer (Surlyn Resin No. 1707, Du Pont Chemical Corp.) and to the outer surface of each ionomer resin layer was a polyethylene layer (Resin No. PE. 4394, Du Pont Chemical Co.) thus, the laminate had a structure as follows: 1.0 mil polyethylene/0.15 mil ionomer/0.5 mil nylon 6/1.0 mil nylon 6/0.15 mil ionomer/1.2 mil polyethylene. After cooling from extrusion, the tubing was stretch oriented by the bubble technique from a hot water bath maintained at 110° F. The oriented film showed high tensile strength and had 25% shrink longitudinally and 10% shrink transversely at 185° F.

EXAMPLE II

A three ply tubing was coextruded from a die configuration such as shown in FIG. 1. The central layer was the same nylon 6 resin as used in Example I and the two outer layers were formed from ethylene vinyl-acetate copolymer. (Resin No. 6260, Gulf Oil Co.) The extruded tubing had the following structure: 1.2 mil ethylene vinyl-acetate copolymer/3.3 mil nylon 6/1.5 mil ethylene vinyl-acetate copolymer. The tubing was then oriented into clear film from a water bath temperature of 140° F from a configuration as shown in FIG. 2.

EXAMPLE III

A three ply laminate was prepared by the process represented in FIG. 1 and the two outer layers were prepared from ionomer resin (Surlyn Resin No. 1652, Du Pont Chemical Co.) and the inner nylon layer was prepared from the same nylon 6 resin as used in Examples I and II. The resulting tubing had a configuration as follows: 1.0 mil ionomer/2.5 mil nylon 6/1.5 mil ionomer. The tubing was oriented into film from a hot water bath maintained at 140° F in a configuration similar to that shown in FIG. 2. The film was clear and readily heat sealable.

EXAMPLE IV

A tubing similar to that made in Example III was made and stored. Samples taken from the stored tubing were oriented at various time intervals after coextrusion. Stable orientation could be performed on film stored from 0 to 2 hours after extrusion. However, beginning at about 2½ hours after extrusion, orientation could still be performed, but the process was beginning to become unstable. Tubing stored as long as 24 hours was completely unorientable by the bubble process.

EXAMPLE V

A two ply tubing was prepared in which ionomer resin (Surlyn Resin No. 1650, Du Pont Chemical Co.) was on the outside and nylon 6 (Resin B-2, Akalon) was on the inside. The tubing structure was as follows: 2 mil ionomer/4 mil nylon 6. When the tubing was extruded with water on the inside it could not be oriented as long as the nylon was wet. However, when the tubing was extruded without water on the inside, it was readily orientable from a hot water bath of 140° F. It was noted that even if a drop of condensed water fell into the tubing a white blemish would appear on the film.

While it is understood that the present specification and claims are not to be limited by the following explanation of the effect of water on nylon's orientability, it is theorized that since nylon will crystallize with time after extrusion that water or moisture accelerates the crystallization process by acting in the nature of a catalyst or plasticizer. Thus, the removal of moisture will slow down or inhibit the crystallization rate. For this reason nylon may be oriented at low temperatures as long as 2½ hours after extrusion when moisture has been excluded. The inherent recrystallization begins to dominate after that period of time but orientation at elevated temperatures could take place as long as 4 hours after extrusion because the effect of the elevated temperature on the molecular structure of the nylon will offset some of the crystallization that has taken place.

The fact that all layers of the laminates in the foregoing examples are oriented to the same degree is demonstrated by the smoothness of the laminates and the lack of any delamination or wrinkles both in the oriented film and in the shrunken product. If there were differences in the degree of orientation then one layer would stretch more or less or shrink more or less than other layers thus causing wrinkling or delamination.

Figure 3:
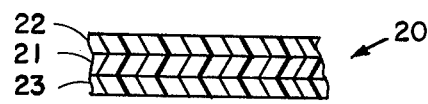
FIG. 3 is a cross section in partial section of a three layer laminate according to the present invention.
Figure 4:
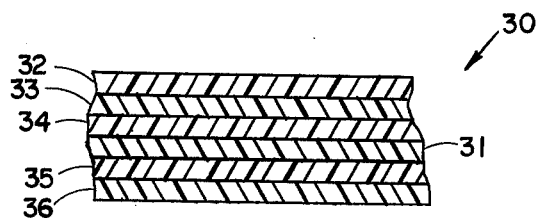
FIG. 4 is a cross section in partial section of a six layer laminate according to the present invention.

Cross-sections of laminates according to this invention are schematically represented by FIGS. 3 and 4. Examples II and III describe three ply laminates 20 such as shown in FIG. 3 with the center layer 21 being an amide polymer and the outer layer 22 and 23 being olefin polymers. In FIG. 4 a six ply laminate 30 representing the structure of Example I is shown with the two innermost layers 31 and 34 being prepared from amide polymers and outer layers 32, 33, 35, and 36 being olefin polymers. Generally, the outer layers in either configuration could be any polymeric material capable of stretching and olefins are preferred because of their well known resistance to moisture. In addition, FIG. 4 can represent a section of a three-ply tubular laminate which has been collapsed and flattened. The inner amide layers 31 and 34 would be protected from moisture being on the inside of the tube and the outer polymeric layers 32, 33, 35, and 36 would protect the amide layers from atmospheric moisture.

From the foregoing examples it is seen that an oriented nylon laminate may be produced as long as moisture is excluded from the nylon; and, in each of the examples above the layers of the laminate had the same degree of orientation. Thus, the process of the present invention achieves the following: a choice of either continuous or discontinuous orientation of nylon at low temperatures by the bubble process; the formation of a nylon laminate with components of the laminate oriented to the same degree; and, the orientation of olefin polymers below their normal orientation temperatures.

Example VI

Multi-ply laminates were prepared as in the foregoing examples with outer layers of ethylene vinyl-acetate copolymer (EVA) and a central layer of a blend of nylon 6 and nylon 66. The blend proportions were: 100% nylon 6; 80% nylon 6, 20% nylon 66; 50% nylon 6, 50% nylon 66; 20% nylon 6, 80% nylon 66; and 100% nylon 66. A five ply, tubular coextrusion die was used so that the wall cross-sectional construction was represented by the following layers: EVA/EVA/nylon blend/EVA/EVA. After coextrusion, the laminate was cooled and flattened. In this unstretched state te laminate is referred to as a "tape."

Instead of a hot water bath the tape was passed through an oven maintained at 210° F, inflated, and expanded into a bubble to produce biaxially oriented film. At the point of bubble initiation the temperature of the film was 148° F.

FIGS. 5 through 10 are graphs of the significant data obtained from the tapes and films of the blends. The data is for the nylon layer only as the EVA layers were stripped away in order to make measurements.

In addition to making an oriented film of nylon 6 alone, an oriented film of nylon 66 was achieved which did not have a measureable shrinkage at 185° F but had a longitudinal shrinkage of 24% and a transverse shrinkage of 7% at 205° F.

Figure 5:
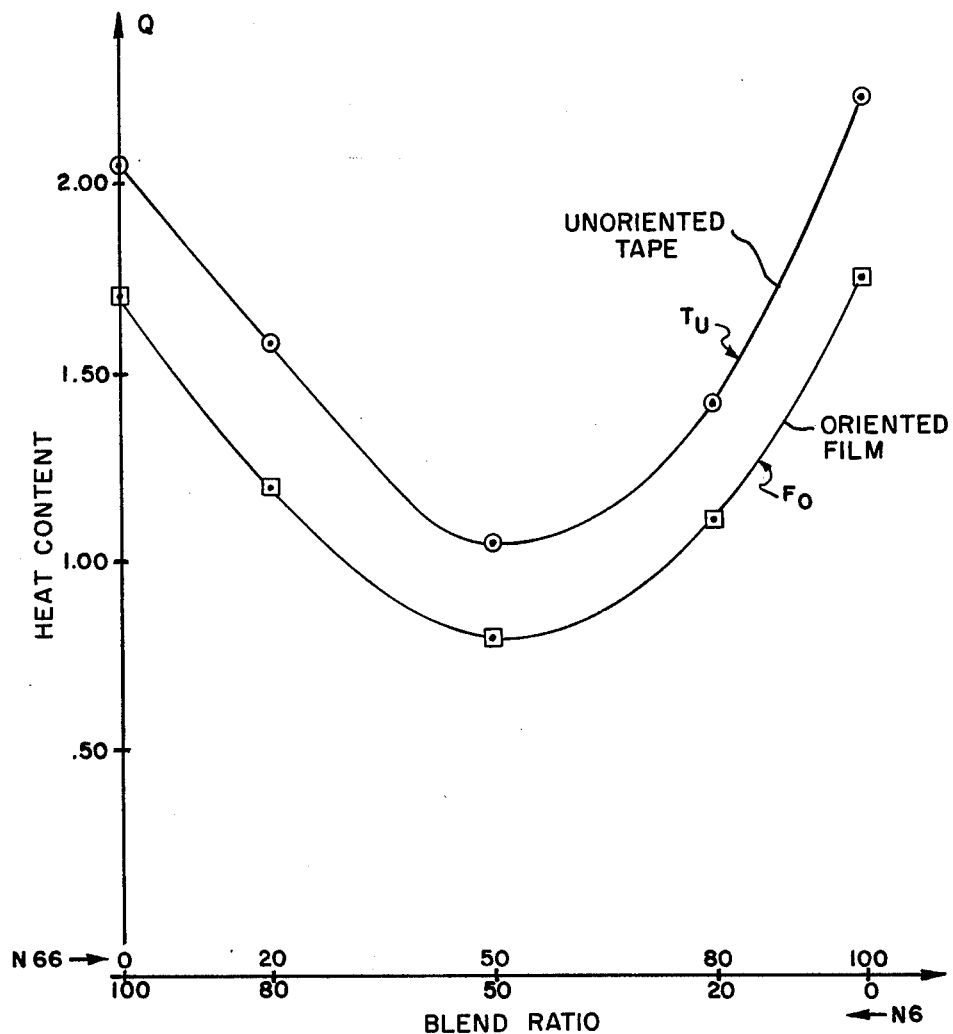
FIG. 5 is a curve of integrated heat content at melting versus the blend ratio of nylon 6 and nylon 66 demonstrating the relative crystallinity of the blends.

Looking at FIG. 5 two curves of integrated heat content at melting, Q, are shown plotted against the blend ratio of nylon 66 to nylon 6. The integrated heat content is obtained from the area under the crystalline melting point peaks on the curve of heat content versus temperature for each specific blend ratio. In other words, the melt curve for each blend is first prepared, the melt curve being the heat content of the specific blend versus the temperature. As is well known, the heat content of a crystalline thermoplastic material will rise linearly with temperature until the melting temperature range is encountered and in this range heat content or enthalpy will rapidly increase to a peak and then decrease to a linear function again. For nylon 6, the peak on heating is at about 410° F and for nylon 66 it occurs at about 510° F. The area under the peaks in the curve is an integrated heat content value, Q, and is a measure of the relative crystallinity of the blend because Q represents the energy to break down or melt the crystalline structure and, consequently, the greater the energy required, the more crystalline is the polymeric blend.

For the first points on the curves in FIG. 5, the blend is 100% nylon 6 and only a single melting peak was present in the melt curves and the areas under these peaks (units are proportional to calories/gram $\times$ °K) were plotted. The curve $T_u$ represents unoriented tape and the curve $F_o$ represents oriented film. This procedure was repeated for the various blend percentages. Two melting peaks were present in the 20% nylon 66/80% nylon 6 blend representing both the nylon 66 and nylon 6 peaks. However, at the 50—50 point the two distinct peaks disappeared.

The minimum relative crystallinity which occurs at about the 50—50 blend in FIG. 5 is reflected in maxima and minima in the other properties plotted in FIGS. 6 through 10. Significantly, the blend is less crystalline than either nylon 6 or nylon 66 alone thereby giving a nylon composition which is more amorphous than those previously available.

Figure 6:
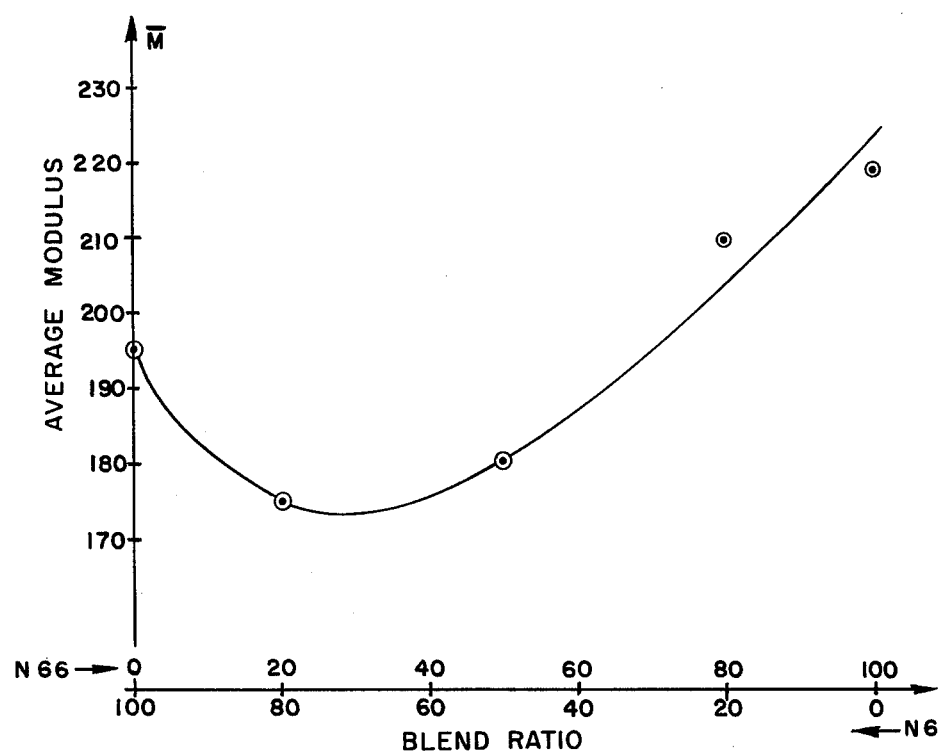
FIG. 6 is a curve of average modulus versus blend ratio of nylon 6 and nylon 66.
Figure 7:
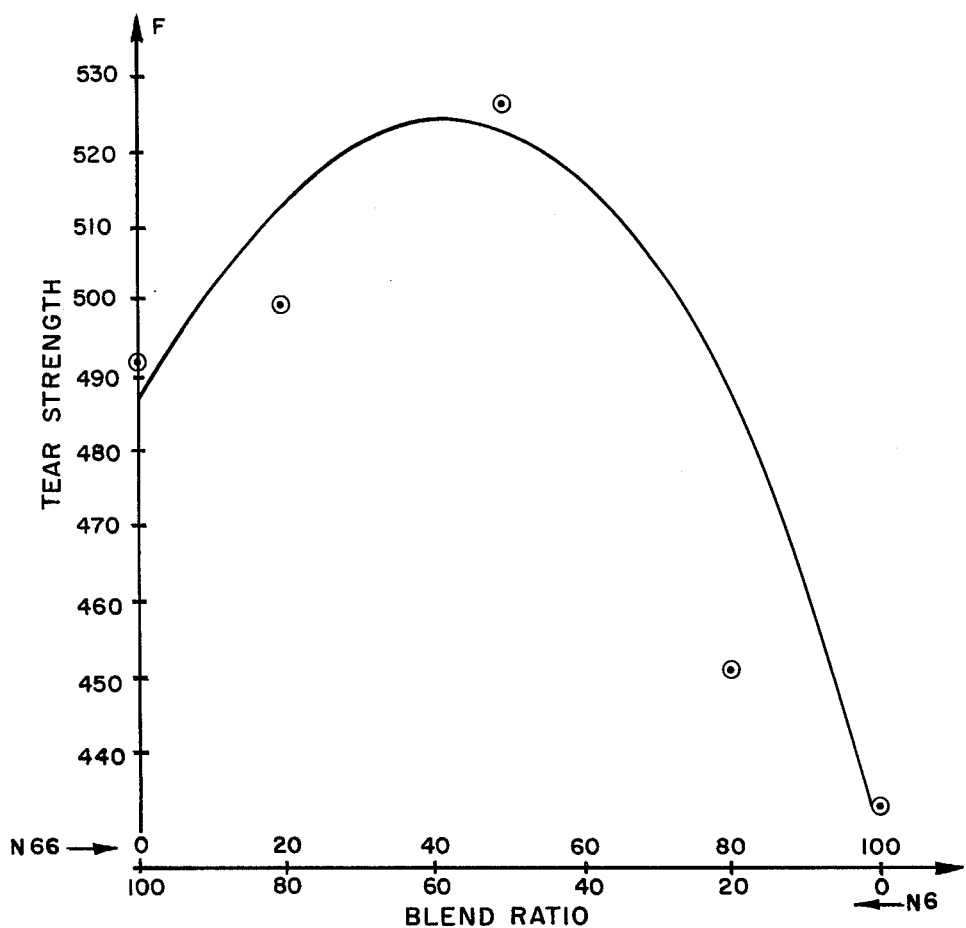
FIG. 7 is a curve of tear strength versus blend ratio of nylon 6 and nylon 66.

In FIG. 6 the average, M, of the longitudinal and transverse elastic moduli of the tape is plotted against the blend ratio, the average modulus, M, being in terms of p.s.i. $\times$ $10^3$. Likewise, in FIG. 7 tear strength, F, in grams, is plotted against blend percentage. The average modulus curve has a minimum at approximately the 50—50 blend and the tear strength, F, has a maximum value at about this same blend ratio.

Figure 8:
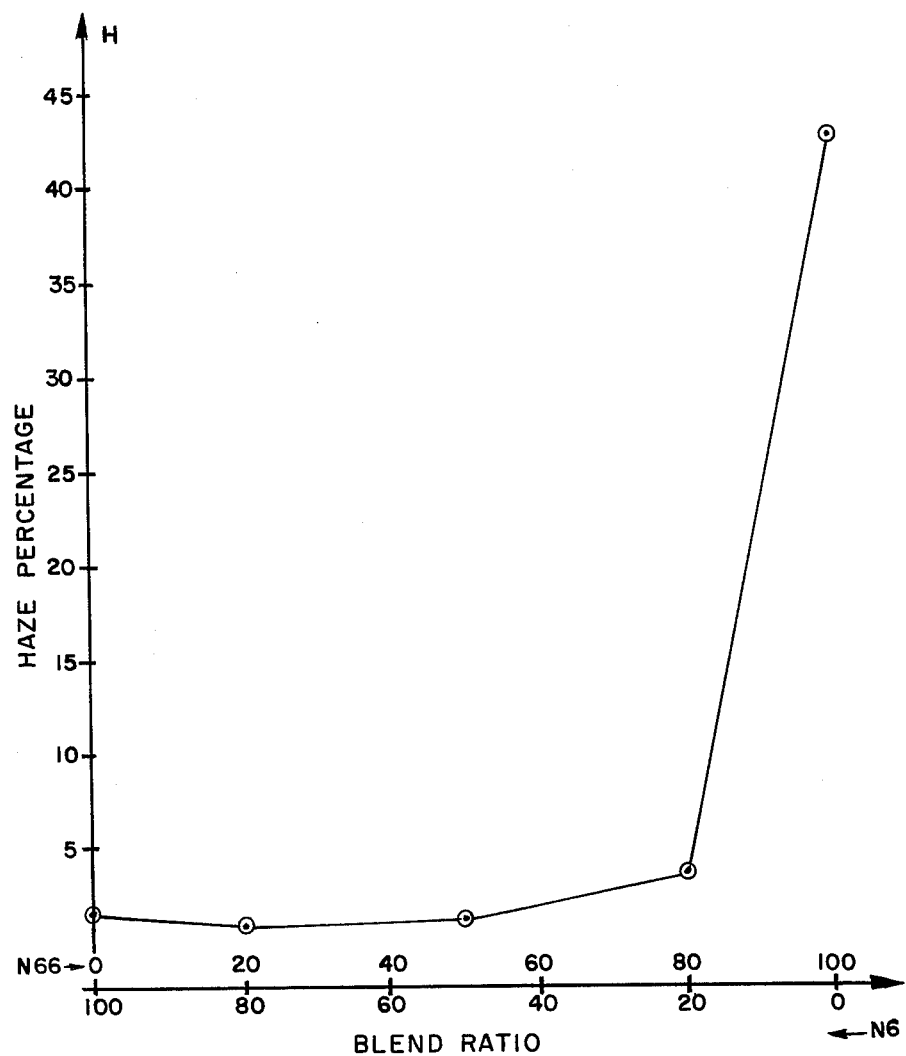
FIG. 8 is a curve of film haze versus the blend ratio of nylon 6 and nylon 66.

FIGS. 8 and 9 are plots of percent of haze versus blend and percent of light transmission versus blend. The curves indicate optimum values up to the 80% nylon 66, 20% nylon 6 blend afterwhich an increase in the proportion of nylon 66 results in a decrease in optical properties.

FIG. 10 is a plot of density, $\rho$, in grams/cc versus blend proportion. A maximum density of the blend is indicated at 20% nylon 66/80% nylon 6.

It is surprising to discover that the properties of a blend of two nylons namely, nylon 66 and nylon 6, pass through maximum and minimum values rather than being linear and that oriented film can be made from such blends. Particularly, the beneficial properties such as minimum haze, maximum light transmission, and maximum tear strength occur in the blend rather than either in straight nylon 6 or nylon 66.

Having thus described my invention, I claim:

1. A laminated film article comprising:
   (a) a moisture-free layer comprising a blend of 20 to 80% by weight of nylon 6 and 80 to 20% by weight of nylon 66; and,
   (b) polymeric layers laminated to each side of said blended nylon layer, said polymeric layers comprising polymers selected from the group consisting of olefin polymers and copolymers.
2. The laminated film article of claim 1 wherein all layers are oriented to the same degree.
3. The laminated film article of claim 2 wherein all layers are biaxially oriented to the same degree.
4. A film comprising:
   (a) a blend of 20 to 80% by weight of nylon 6 with 80 to 20% by weight of nylon 66; and,
   (b) said film being oriented in at least one direction.
5. The film of claim 4 wherein said film is biaxially oriented.